US009045207B2

(12) United States Patent
Anderson et al.

(10) Patent No.: US 9,045,207 B2
(45) Date of Patent: Jun. 2, 2015

(54) INFLATOR ASSEMBLY ADAPTED FOR MANUAL OR AUTOMATIC INFLATION

(71) Applicant: Carleton Technologies, Inc., Orchard Park, NY (US)

(72) Inventors: Ryan Anderson, Seminole, FL (US); Robert E. Clark, Seminole, FL (US)

(73) Assignee: Carleton Technologies, Inc., Orchard Park, NY (US)

( * ) Notice: Subject to any disclaimer, the term of this patent is extended or adjusted under 35 U.S.C. 154(b) by 14 days.

(21) Appl. No.: 13/944,212

(22) Filed: Jul. 17, 2013

(65) Prior Publication Data

US 2014/0020791 A1 Jan. 23, 2014

Related U.S. Application Data

(60) Provisional application No. 61/674,579, filed on Jul. 23, 2012.

(51) Int. Cl.

| | |
|---|---|
| ***B63C 9/19*** | (2006.01) |
| ***B60C 29/00*** | (2006.01) |
| ***F17C 7/00*** | (2006.01) |
| ***F17C 13/06*** | (2006.01) |
| *B63C 9/00* | (2006.01) |

(52) U.S. Cl.

CPC ... *B63C 9/19* (2013.01); *B63C 9/24* (2013.01); *F17C 7/00* (2013.01); *F17C 13/06* (2013.01); *B63C 2009/0041* (2013.01); *B63C 2009/0064* (2013.01); *B63C 2009/007* (2013.01); *F17C 2270/0772* (2013.01)

(58) Field of Classification Search

CPC ...... B63C 9/18; B63C 9/19; B63C 2009/007; B63C 2009/0023; B63C 2009/0064

USPC .......... 141/38, 114, 329, 330; 441/92, 93, 94, 441/99, 100, 101; 280/728.2

See application file for complete search history.

(56) References Cited

U.S. PATENT DOCUMENTS

| | | | | |
|---|---|---|---|---|
| 3,080,582 | A * | 3/1963 | Reffell | 114/345 |
| 3,266,669 | A * | 8/1966 | Vuyosevich | 222/5 |
| 4,223,805 | A * | 9/1980 | Mackal | 222/5 |
| 4,267,944 | A * | 5/1981 | Mackal | 222/5 |
| 4,356,936 | A * | 11/1982 | Legris | 222/5 |
| 4,475,664 | A * | 10/1984 | Mackal | 222/5 |
| 4,498,604 | A * | 2/1985 | Mackal | 222/5 |
| 4,582,494 | A * | 4/1986 | Becnel | 441/95 |
| 5,026,310 | A * | 6/1991 | Mackal et al. | 441/93 |
| 5,509,576 | A * | 4/1996 | Weinheimer et al. | 222/5 |
| 6,254,447 | B1 * | 7/2001 | Niemann | 441/101 |
| 6,435,371 | B1 * | 8/2002 | Perrins | 222/5 |
| 6,951,493 | B1 * | 10/2005 | Lu | 441/93 |
| 6,991,005 | B2 * | 1/2006 | Fedeli | 141/114 |
| 7,299,816 | B2 * | 11/2007 | Rouleau et al. | 137/68.3 |
| 7,669,616 | B2 * | 3/2010 | Bruengger | 141/19 |
| 8,826,931 | B2 * | 9/2014 | Clark et al. | 137/81.2 |

(Continued)

*Primary Examiner* — Timothy L Maust
*Assistant Examiner* — Andrew Schmid
(74) *Attorney, Agent, or Firm* — Jaeckle Fleischmann & Mugel, LLP

(57) ABSTRACT

Disclosed is an inflator assembly. The assembly operates by puncturing a diaphragm of an associated container to thereby releasing a volume of pressurized gas. The pressurized gas, in turn, is used to inflate an article, such as a life raft. The inflator assembly is adapted to be either manually or automatically actuated. The various details of the present disclosure, and the manner in which they interrelate, are described in greater detail hereinafter.

7 Claims, 9 Drawing Sheets

(56) References Cited

U.S. PATENT DOCUMENTS

2004/0061318 A1* 4/2004 Ord ............................... 280/737
2005/0245149 A1* 11/2005 Medford et al. ................ 441/95
2013/0210297 A1* 8/2013 Maas et al. ...................... 441/95
2014/0020791 A1* 1/2014 Anderson et al. ............. 141/114

* cited by examiner

INFLATOR ASSEMBLY ADAPTED FOR MANUAL OR AUTOMATIC INFLATION

RELATED APPLICATION DATA

This application claims priority to application Ser. No. 61/674,579 filed on Jul. 23, 2012 and titled "Inflatable Life Preserver and Associated Delivery System." The contents of this application are fully incorporated herein.

TECHNICAL FIELD

This disclosure relates to an inflator assembly. More particularly, the present invention relates to an inflator assembly that can be activated either manually or automatically.

BACKGROUND OF THE INVENTION

A wide variety of inflator assemblies are known in the art. Inflator assemblies are used to rupture a container of fluid under pressure. Inflator assemblies may use a piercing pin to rupture a diaphragm and allow gas, such as $CO_2$, to escape. The inflator can then be used in routing the escaping gas into an inflatable article. Articles such as life preservers and life rafts commonly employ this arrangement. Many inflators are either manually or automatically actuated. Manual inflators allow a user to pull a handle or cable to release an associated pierce pin and begin inflation. Automatic inflators operate in connection with a sensor, such as a water or salinity sensor. These sensors, automatically release the pierce pin upon detecting water. Automatic inflators are preferable because they allow inflation in situations where the user may be unconscious or incapacitated. Manual inflators, on the other hand, are beneficial because they allow users to selectively begin inflation at the discretion of the user.

What is needed, therefore, is an inflator assembly that allows for both manual and automatic inflation. There is also a need for an inflator with both manual and automatic activation where the two activation means do not interfere with one another.

SUMMARY OF THE INVENTION

The disclosed system has several important advantages. For example, the inflator assembly of the present disclosure allows for either manual or automatic activation via a single mechanism.

A further possible advantage is that a single mechanism is provided for either manual or automatic inflation and wherein the two mechanisms do not interfere with one another.

Still yet another possible advantage of the present system is to allow for an article to be automatically inflated when one or more sensors detects a pre-determined condition.

Another advantage of the present system is to allow for an article to be manually inflated upon pulling an activator cable.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF THE DRAWINGS

The present disclosure relates to an inflator assembly. The assembly operates by puncturing a diaphragm of an associated container to thereby releasing a volume of pressurized gas. The pressurized gas, in turn, is used to inflate an article, such as a life raft. The inflator assembly is adapted to be either manually or automatically actuated. The various details of the present disclosure, and the manner in which they interrelate, are described in greater detail hereinafter.

Figure 1:
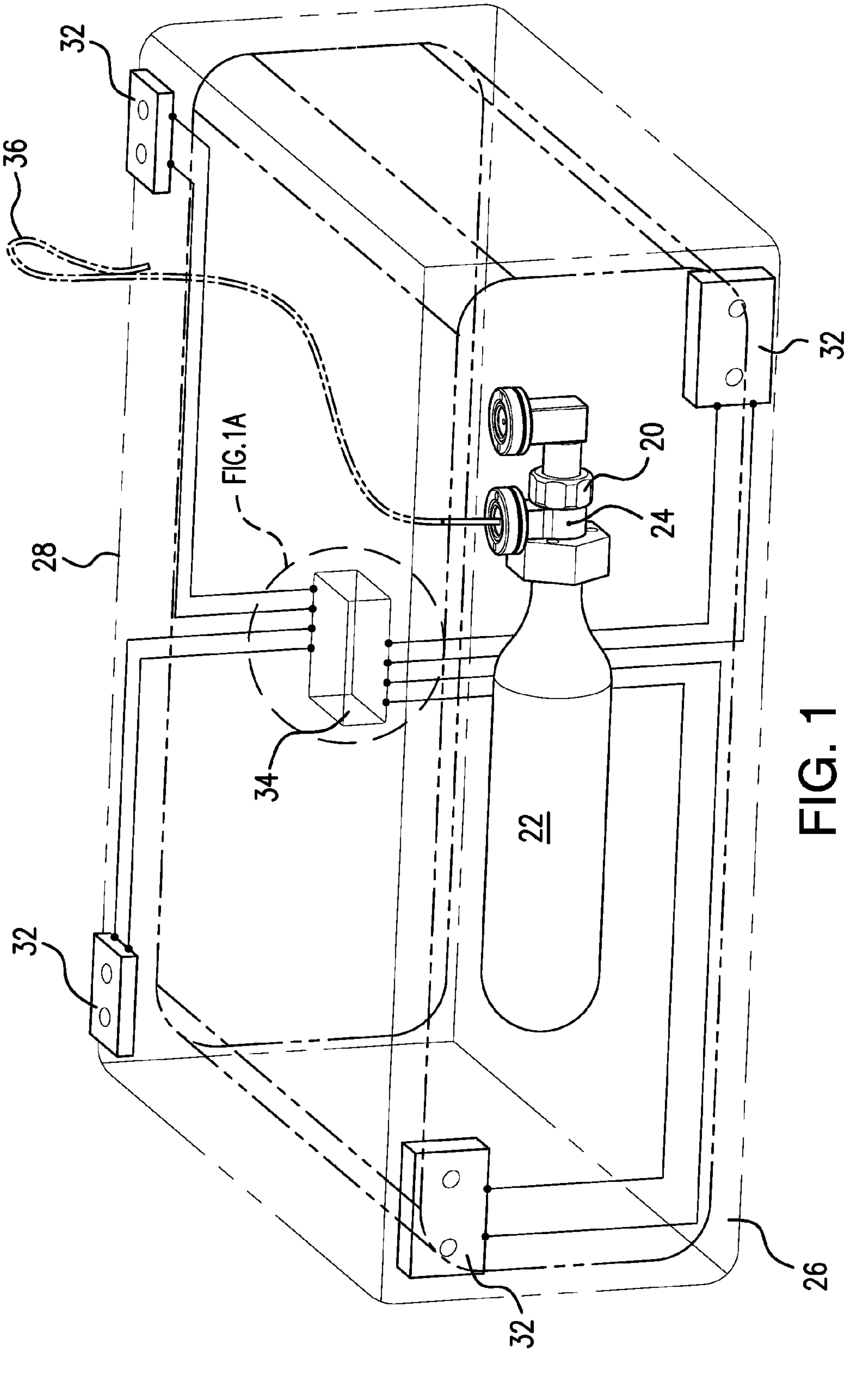
FIG. 1 is a perspective view of the inflator assembly positioned within an article to be inflated.
Figure 1A:
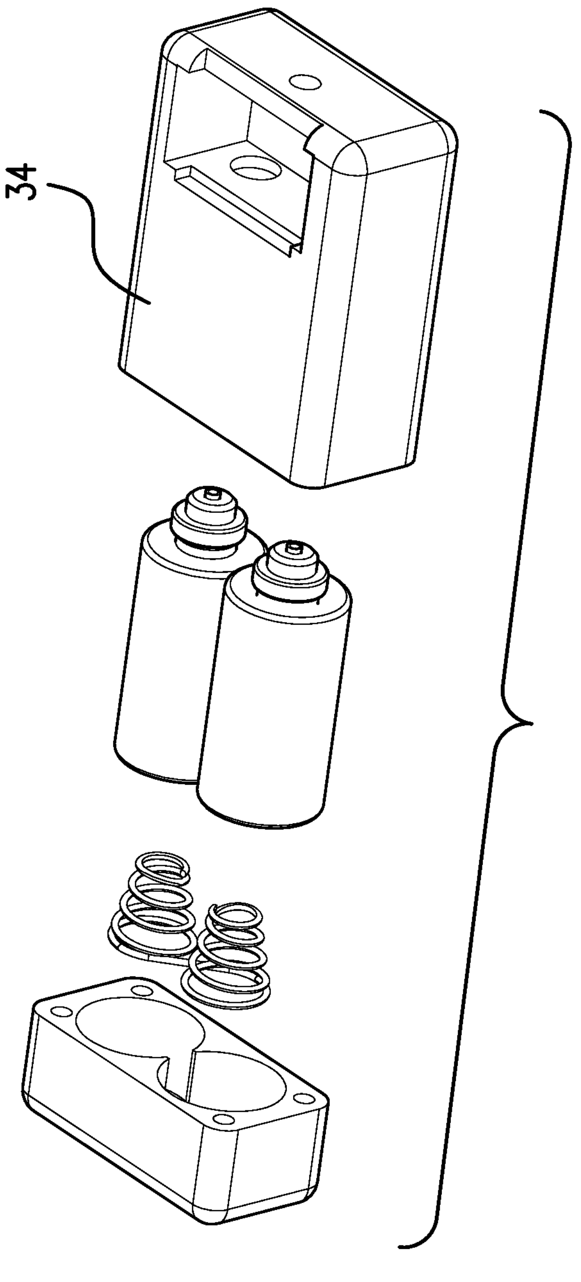
FIG. 1A is a detailed view of the electronic package assembly associated with the present disclosure.
Figure 2:
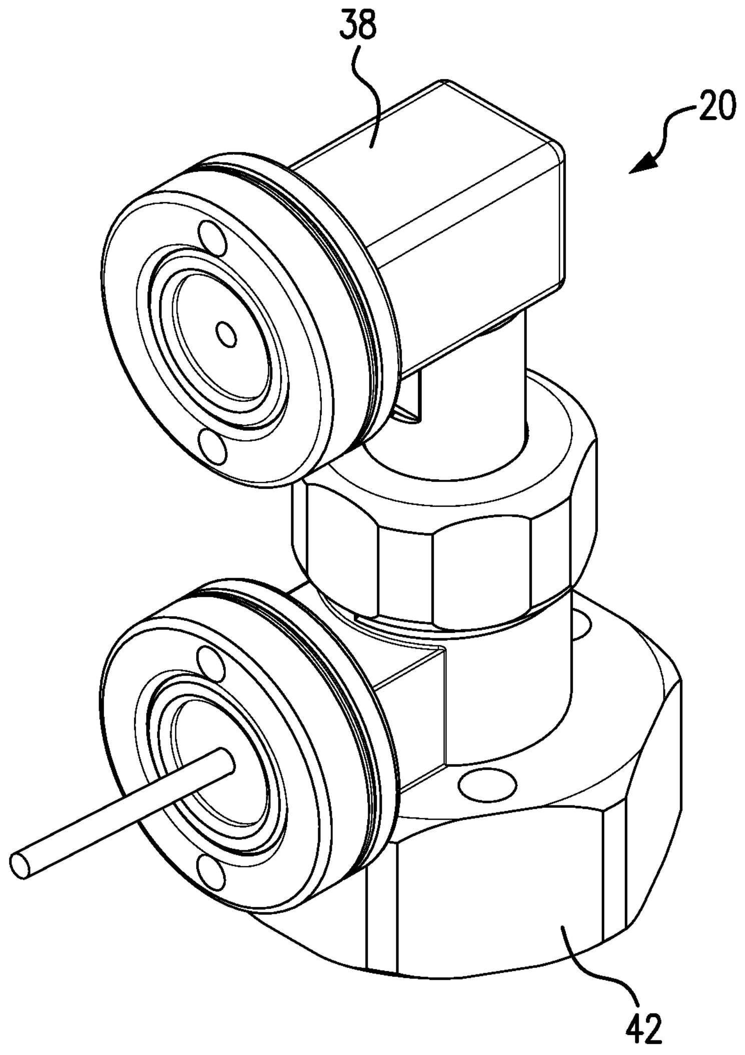
FIG. 2 is a perspective view of the inflator assembly of the present disclosure.
Figure 3:
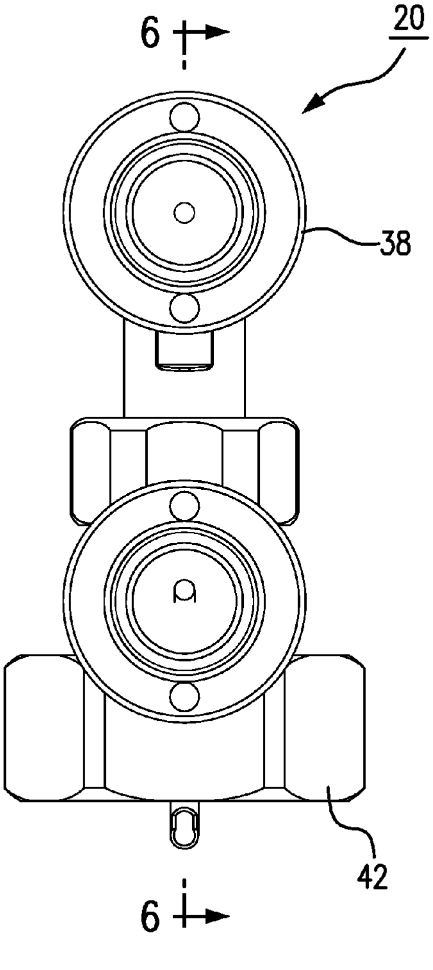
FIG. 3 is a front elevational view of the inflator assembly.
Figure 4:
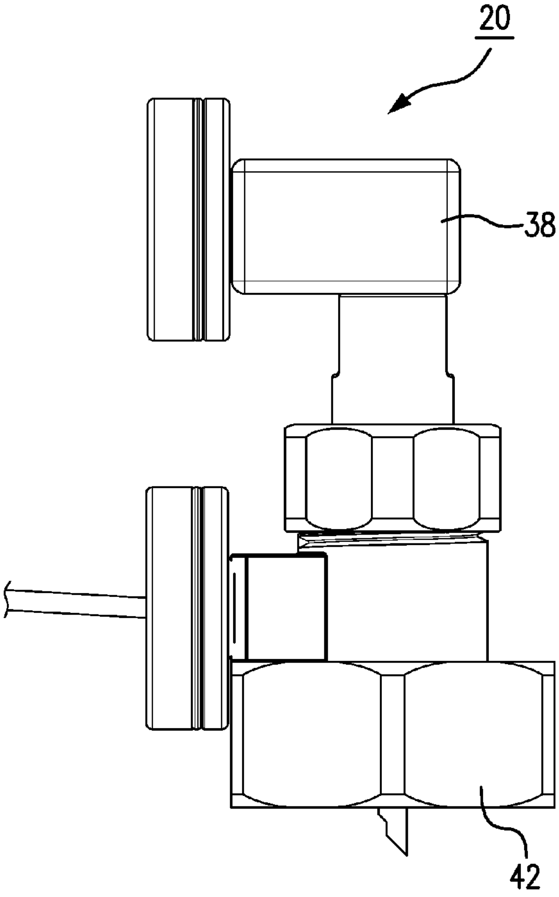
FIG. 4 is a side elevational view of the inflator assembly.
Figure 5:
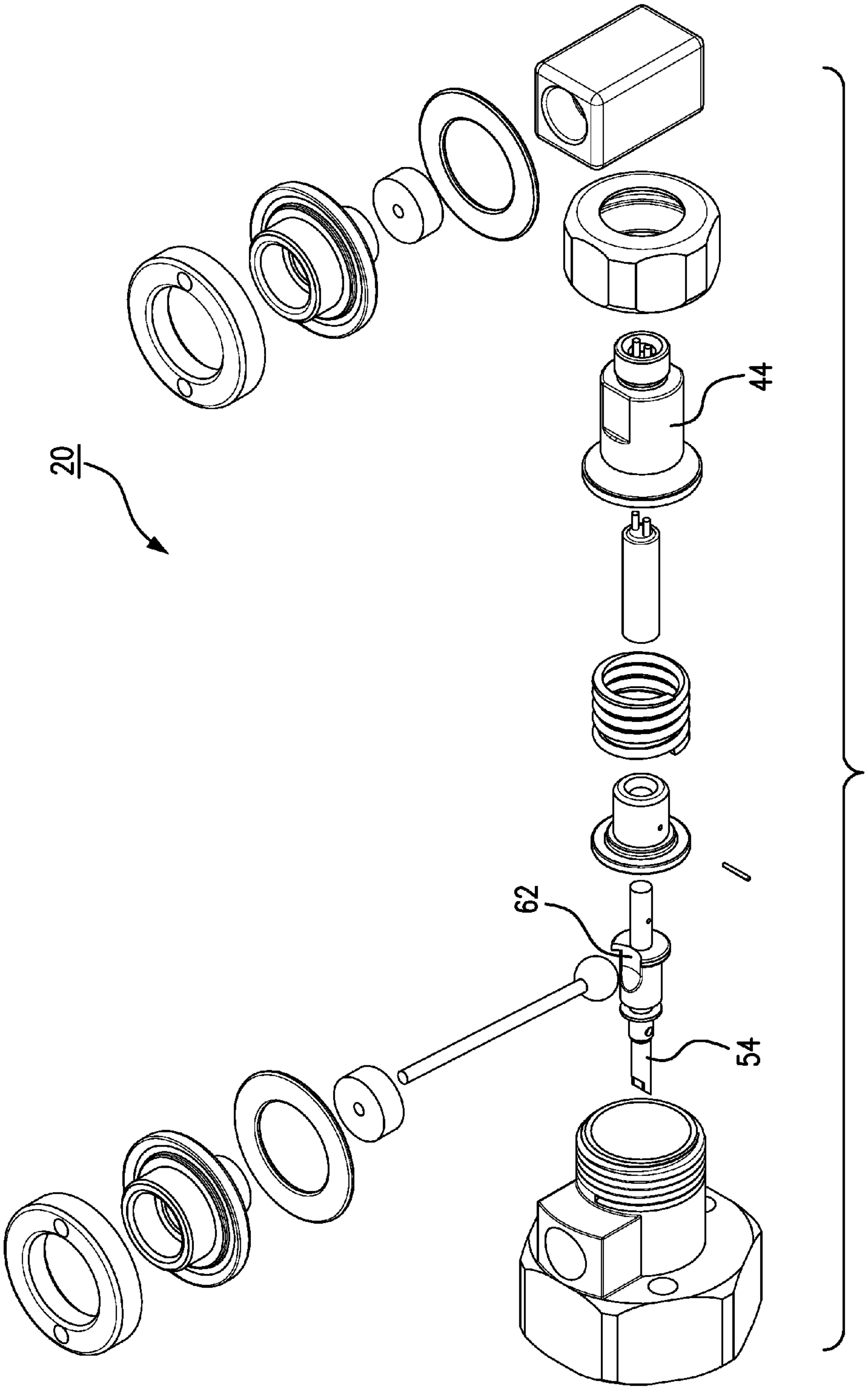
FIG. 5 is an exploded view of the inflator assembly.

FIG. 1 is a perspective view of the environment in which the inflator is used. The inflator 20 is fitted to a container or bottle 22 of a pressurized fluid such as $CO_2$. An exit port 24 is included upon the inflator for allowing escaping gas to fill an associated article. In the depicted embodiment, the article 26 is a six man life raft manufactured by the Winslow Life Raft Company of Lake Suzy, Fla. However, the inflator assembly of the present invention can readily be used in connection with other types of inflatable articles. The depicted life raft is positioned within an outer container 28 prior to inflation. As illustrated, sensors 32 and an electronic package assembly (EPA) 34 can be position within the life raft container. The sensors and EPA (32 and 34) are used in automatically inflating the life raft as noted below. A manual pull cable 36 is also routed outside the container. The cable 36 can be used by an operator to initiate the manual inflation of life raft 26.

Figure 6:
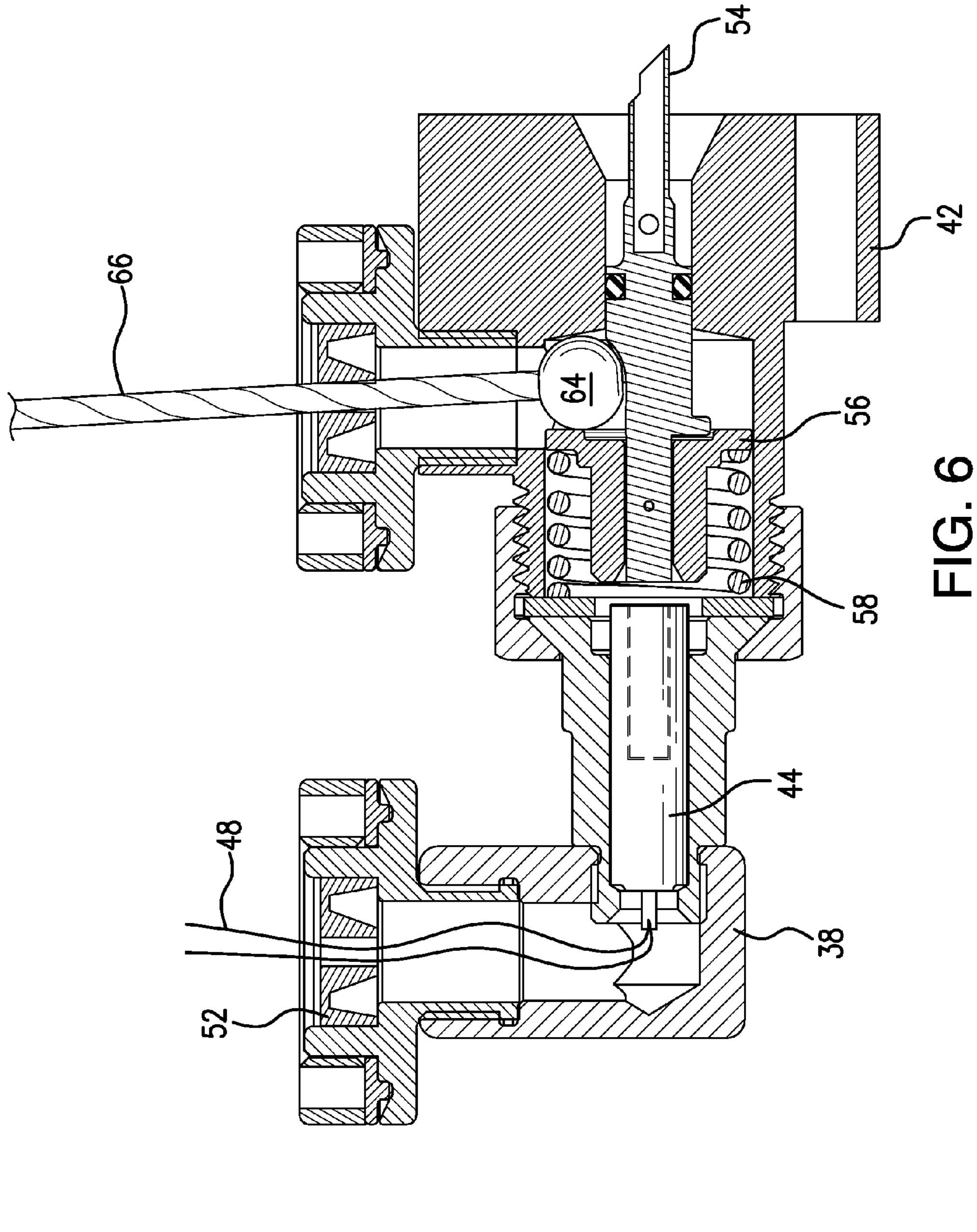
FIG. 6 is a sectional view of the inflator assembly in the unextended orientation.
Figure 6A:
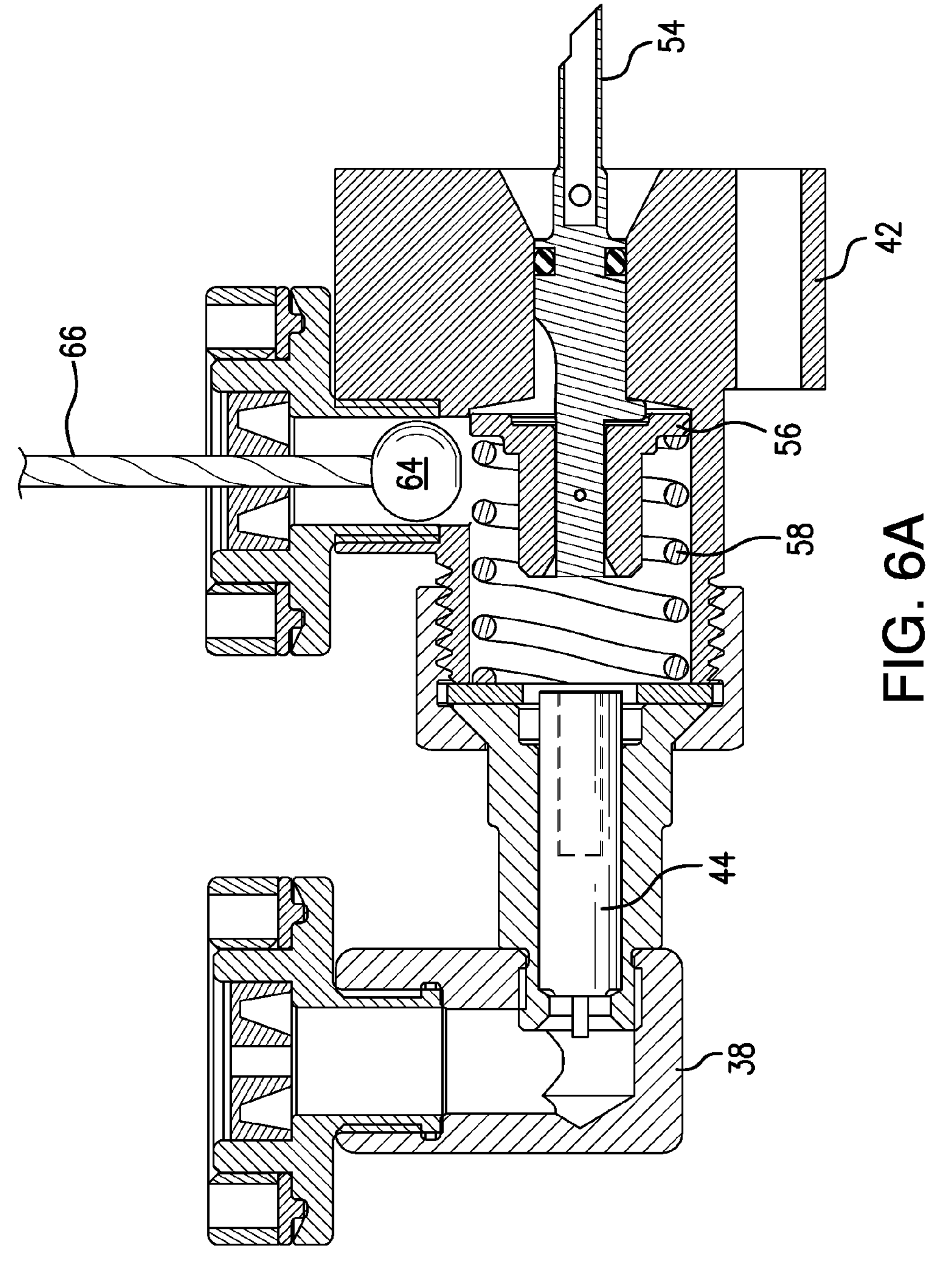
FIG. 6A is a sectional view of the inflator assembly in the extended orientation.
Figure 6B:
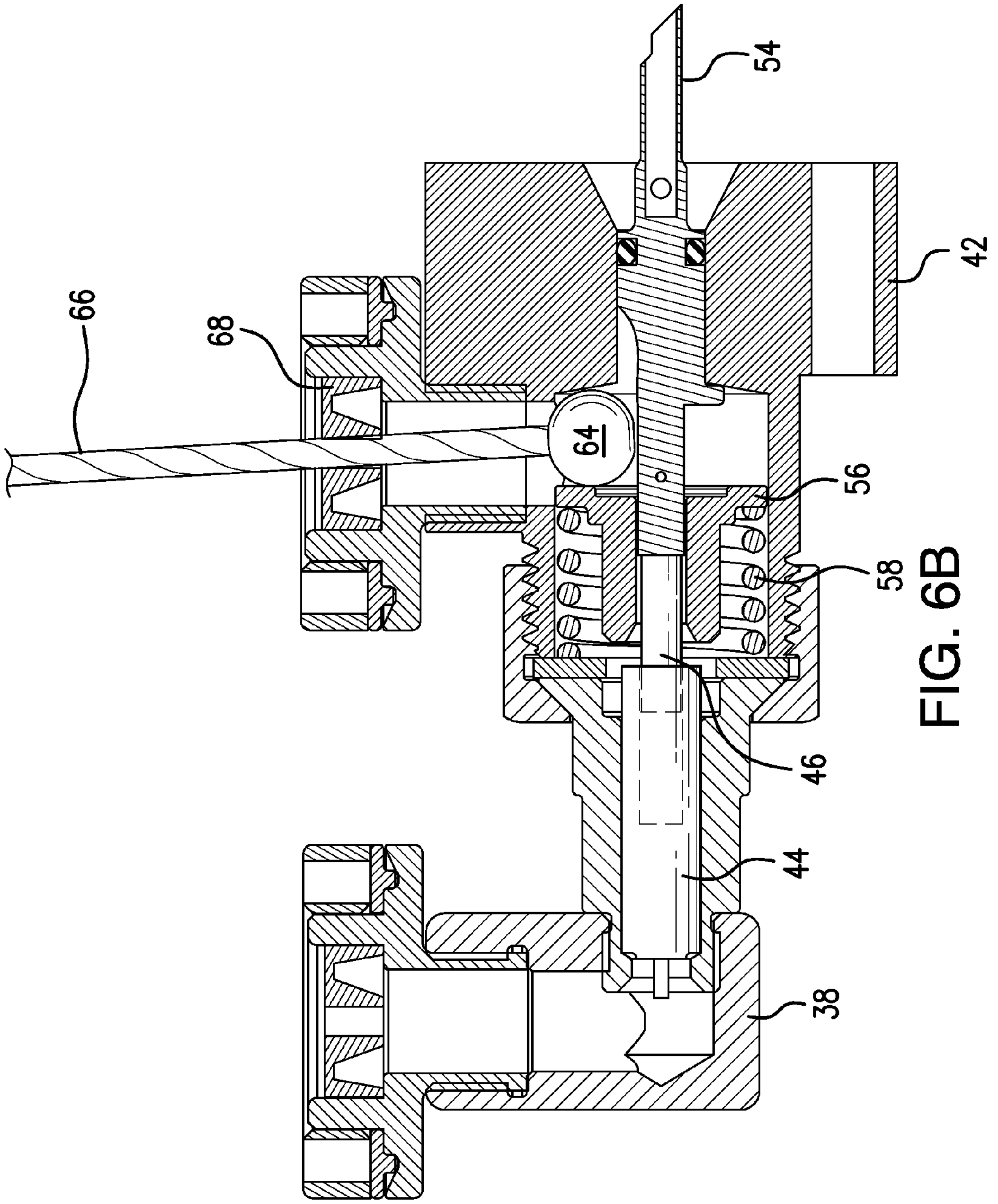
FIG. 6B is a sectional view of the inflator assembly in the extended orientation.

The function and operation of the inflator assembly 20 will be described in connection with the cross sectional views of FIGS. 6, 6A and 6B. As illustrated, the inflator is formed from first and second housing assemblies (38 and 42). The first housing assembly has a threaded extent and an opening. A pyro-actuator device 44 is stored within the first housing. Any of a variety of known pyro-actuators 44 can be used in connection with the present disclosure. The pyro-actuator 44 preferably includes a piston 46 and cylinder (FIG. 6B). When activated, the piston 46 extends from the cylinder (FIG. 6B); when un-activated, the piston 46 is positioned or housed within the cylinder (FIGS. 6 and 6A). The pyro actuator 44 is electrically activated via one or more wires 48. These wires 48, in turn, connect the pyro-actuator 44 to the external electronic package assembly (EPA) 34. A first vacuum seal 52 is coupled to the opening of the first housing 38. This vacuum seal 52 allows the wiring between the EPA 34 and pyro-actuator 44 to extend into the first housing 38 in a water tight fashion.

The second housing component 42 includes a threaded extent that is coupled to the threaded extent of the first housing component 38. The second housing 42 includes first and second openings and a piercing pin 54. The piercing pin 54 has a proximal end, a distal end, and an intermediate extent therebetween. The piercing pin 54 is in axial alignment with, and is adapted to be driven by, the piston 46 within the pyro-actuator 44. With continuing reference to FIGS. 6, 6A, and 6B, a bushing 56 and spring 58 are positioned about the proximal end of the piercing pin 54. The bushing 56 includes a narrowed body and peripheral flange at a lower end. One end of the spring 58 rests upon the peripheral flange of the bushing 56. The peripheral flange of the bushing 56 is coupled to a mating peripheral flange along the intermediate extent of the piercing pin. As such, movement of the bushing 56 effects movement of the piercing pin 54.

The piercing-pin 54 also includes an arcuate cut-out 62 formed along its intermediate extent. A spherical retainer 64 is adapted to be positioned within the cut-out 62. As noted in FIG. 6, the retainer 64 can be positioned against the flange of the bushing 56 to thereby prevent the bushing 56 from moving and keep the spring 58 compressed. A cable 66 connected to the retainer 64 and permits the selective removal of the retainer 64. Once retainer 64 is removed, as noted in FIG. 6A, the bushing 56 is moved via the spring force 58. This, in turn, moves the piercing pin 54 to its extended orientation. As noted in FIG. 6A, in the extended orientation, the piercing pin 54 extends from the first opening of the second housing 42. The piercing pin likewise has a retracted orientation, as noted in FIG. 6, where the distal end is positioned within the second housing.

A second vacuum seal 68 is coupled to the second opening in the second housing 42. This second vacuum seal 68 allows the cable 66 to be routed out of the second opening in a water tight fashion.

Figure 7:
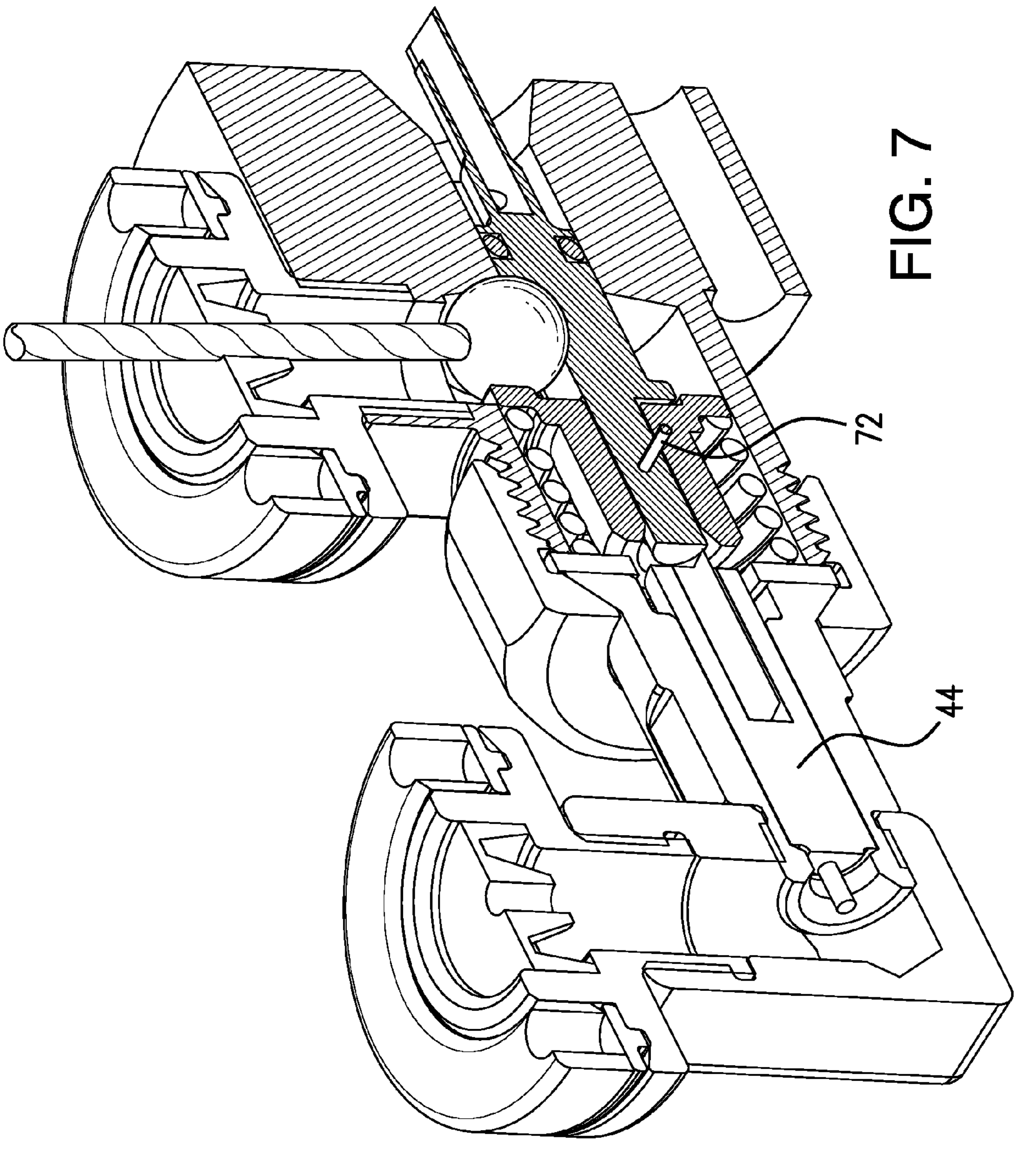
FIG. 7 is a perspective sectional view showing the shear pin utilized in initially retaining the pierce pin.

A shear pin 72 is preferably included to initially retain pin 54 within the outer bushing 56. With reference to FIG. 7, shear pin 72 extends between the intermediate extent of pin 54 and the surrounding busing 56. It is also possible for pin 72 to extend between pin 54 and housing 42. In either event, shear pin 72 is design to break when pin 54 is pushed forward by piston 46. Thus, if pin 72 is connected to bushing 56, it breaks to allow for movement of pin 54 with respect to bushing 56. Otherwise, if pin 72 is connected to housing 42, it breaks upon either manual or automatic activation of inflator 20.

In use, a user can manually activate the inflator by pulling upon cable 36. This, in turn, removes retainer 64 from the arcuate cut-out and thereby allows spring 58 to force bushing 56 and the connected piercing pin 54 to the extended orientation. When extended, pin 54 punctures a diaphragm on container 22, such that the inflatable article begins to inflate. Alternatively, the article can be automatically inflated. This occurs upon sensors 32 detecting a pre-determined condition. This per-determined condition can be detecting the presence of sea water or a change in atmospheric pressure. When the condition is detected by sensors 32, the EPA 34 then sends an activation signal to the pyro-actuator 44 via wires 48. Upon activation, piston 46 of the pyro-actuator 44 extends through a central opening in bushing 56. This permits bushing 56 to remain stationary as piston 46 pushes the piercing pin 54 into the extended orientation as illustrated in FIG. 6A. Pin 72 extending between piston 46 and the surrounding bushing 56 is preferably severed during this process. Notably, automatic activation allows pin 54 to be extended to puncture the diaphragm of container 22 within movement of either retainer 64 or bushing 56.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An inflator assembly for puncturing a diaphragm and releasing a volume of pressurized gas, the pressurized gas being used to inflate an article, the inflator assembly adapted to be either manually or automatically actuated, the inflator assembly comprising:

a first housing having an opening, a pyro-actuator positioned within the first housing, the pyro-actuator including a piston and cylinder, the pyro-actuator having an activated state wherein the piston is extended from the cylinder and an un-activated state wherein the piston is housed within the cylinder, an electronic package assembly (EPA) coupled to the pyro-actuator via a length of wiring;

sensors positioned outside the first housing, the sensors being coupled to the EPA via the wiring, a first vacuum seal coupled to the opening in the first housing, the first vacuum seal allowing the wiring to be routed out of the opening of the first housing in a water tight fashion;

a second housing threadably interconnected to the first housing, the second housing including first and second openings and a piercing pin, the piercing pin having a proximal end, a distal end, and an intermediate extent therebetween, a flange and a cut-out formed along the intermediate extent of the piercing pin, the piercing pin being in axial alignment with the piston of the pyro-actuator, a bushing and spring positioned about the proximal end of the piercing pin, the busing including a peripheral flange that contacts the flange of the piercing pin, a spherical retainer positioned within the cut-out and against the bushing to keep the spring compressed, a cable connected to the retainer and permitting the selective removal of the retainer, the piercing pin having a refracted orientation wherein the distal end is positioned within the second housing and an extended orientation wherein the distal end extends from the first opening of the housing; and a second vacuum seal coupled to the second opening in the second housing, the second vacuum seal allowing the cable to be routed out of the second opening in a water tight fashion;

wherein a user can pull the cable to remove the retainer from the cut-out and thereby manually activate the inflator by allowing the spring to force the bushing and piercing pin to the extended orientation, and further wherein the pyro-actuator is configured to automatically activate the inflator upon detecting a presence of water or change in pressure, wherein the piston extends through the bushing to push the piercing pin into the extended orientation.

2. An inflator assembly for selectively releasing a volume of pressurized gas, the inflator assembly comprising:

an actuator including a piston and cylinder, the actuator having an activated state wherein the piston is extended from the cylinder and an un-activated state wherein the piston is housed within the cylinder, a sensor interconnected to the actuator, the sensor activating the actuator when a pre-determined condition is detected;

a piercing pin having a proximal end, a distal end, and an intermediate extent therebetween, a flange formed along the intermediate extent of the piercing pin, the piercing pin having a retracted orientation and an extended orientation, wherein the piercing pin is configured to puncture a diaphragm when in the extended orientation, the piercing pin being in axial alignment with the piston of the actuator;

a bushing and spring positioned about the proximal end of the piercing pin, the bushing including a peripheral flange that contacts the flange of the piercing pin; and a retainer positioned against the bushing to keep the spring compressed;

wherein a user can remove the retainer and thereby manually activate the inflator by allowing the spring to force the bushing and piercing pin to the extended orientation, and further wherein the actuator is configured to be automatically activated when the sensor detects a presence of water or change in pressure, whereby the piston extends through the bushing to push the piercing pin into the extended orientation.

3. The inflator assembly as described in claim 2 further comprising a cable interconnected to the retainer, wherein the cable can be pulled to manually activate the inflator.

4. The inflator assembly as described in claim 2 wherein the actuator resides within a first housing assembly, a vacuum seal within the first housing assembly, a wire extending through the vacuum seal for use in connecting the sensor to the actuator.

5. The inflator assembly as described in claim 4 wherein the piercing pin, spring, and bushing all reside within a second housing, and wherein the first and second housings are threadably interconnected.

6. The inflator assembly as described in claim 5 further comprising a vacuum seal in the second housing, a cable connected to the retainer and extending through the vacuum seal, the cable permitting a user to move the retainer and manually activate the inflator.

7. The inflator assembly as described in claim 2 further comprising a shear pin extending between the piercing pin and the bushing and wherein the shear pin is broken when the inflator is automatically activated.

* * * * *